US011975952B2

(12) United States Patent
Dell

(10) Patent No.: US 11,975,952 B2
(45) Date of Patent: May 7, 2024

(54) RETRACTABLE DOCKING LINE

(71) Applicant: William Garrett Dell, Greensboro, GA (US)

(72) Inventor: William Garrett Dell, Greensboro, GA (US)

( * ) Notice: Subject to any disclaimer, the term of this patent is extended or adjusted under 35 U.S.C. 154(b) by 617 days.

(21) Appl. No.: 17/155,646

(22) Filed: Jan. 22, 2021

(65) Prior Publication Data

US 2022/0234871 A1 Jul. 28, 2022

(51) Int. Cl.
*B66D 5/34* (2006.01)
*B63B 21/04* (2006.01)
*B66D 1/30* (2006.01)

(52) U.S. Cl.
CPC ................ *B66D 5/34* (2013.01); *B63B 21/04* (2013.01); *B66D 1/30* (2013.01)

(58) Field of Classification Search
CPC .............. B66D 5/34; B66D 1/30; B63B 21/04
See application file for complete search history.

(56) References Cited

U.S. PATENT DOCUMENTS

| | | | | |
|---|---|---|---|---|
| 3,317,936 A | 5/1967 | Johnson et al. | | |
| 3,851,613 A | 12/1974 | Armour | | |
| 4,697,537 A | 10/1987 | Smith | | |
| 4,846,090 A | 7/1989 | Palmquist | | |
| 5,002,003 A | 3/1991 | Blue | | |
| 5,819,679 A | 10/1998 | Bonate et al. | | |
| 6,182,592 B1 | 2/2001 | Molz | | |
| 7,168,385 B1 | 1/2007 | Thomas | | |
| 7,325,509 B2 * | 2/2008 | Gordon | B66D 5/34 | 114/230.1 |
| 7,694,639 B2 * | 4/2010 | Gordon | B66D 1/30 | 114/230.1 |
| 9,630,682 B1 | 4/2017 | Yost | | |
| 9,694,878 B2 | 7/2017 | Johnston | | |
| 10,029,762 B2 | 7/2018 | Padick | | |
| 2006/0150883 A1 | 7/2006 | Gordon et al. | | |
| 2008/0257999 A1 | 10/2008 | Wingale et al. | | |
| 2009/0236460 A1 | 9/2009 | Bourke et al. | | |
| 2011/0146557 A1 | 6/2011 | Underwood | | |

* cited by examiner

*Primary Examiner* — Anthony D Wiest
(74) *Attorney, Agent, or Firm* — Southeast IP Group LLC; Thomas L. Moses

(57) ABSTRACT

A device for storing and dispensing line for mooring a boat to a dock includes a user interface, an auto-retracting reel assembly, and optionally, a conduit connecting the user interface to the reel assembly. The user interface comprises a canister mounted on a gunwale, or the like, for storing the distal, looped end of a mooring line, a top lid that slides horizontally between an open and closed position, a rail support engaged by the top lid, and a bottom lid having a hole defined therein. The extended mooring line may be locked into place by frictional engagement between the spring loaded top lid and the rail support. To retract the mooring line, a user may open the top lid of the user interface for automated retraction, winding around the reel, until the stopping collar prevents the distal, looped end of the mooring line from passing therethrough.

10 Claims, 9 Drawing Sheets

RETRACTABLE DOCKING LINE

BACKGROUND OF THE INVENTION

The present invention relates generally to mooring assemblies for marine vessels and the ability to secure the vessels when docked. More specifically, the present invention includes an automatically retracting assembly for a mooring line, wherein the assembly includes a user interface for storing the distal end of the mooring line, an auto-retracting reel, and optionally, a conduit to connect the user interface and reel, wherein mooring line is wound around the reel and the free, looped end of the mooring line is stored in the canister when not in use. Docking a marine vessel typically involves numerous lines that must be tied between a boat and a dock, pier or the like, and can take up time to secure a vessel to a dock. This configuration is particularly useful in keeping the mooring lines organized and easily accessible for allowing a user to quickly and effectively secure a vessel to a dock.

Heretofore, many efforts have been made to provide assemblies and mechanisms for effectively secure marine vessels to docks. Some examples are set forth hereinbelow, and each of the following references are incorporated herein by reference, in their entireties:

U.S. Pat. No. 3,851,613—Tie Line Clamp Assembly

Claw assembly for a boat tie line includes a reel for the line mounted on the boat to be tied down, and a clamp for clamping the line including a hollow threaded nut and bolt having coaxial openings through which the tie line extends, a resilient annular gasket disposed within the hollow bolt and surrounding the tie line, and an annular flange on the nut for pressing against the gasket so that when the nut is tightened the gasket is compressed and its annular opening constricts against the surrounded tie line to clamp it in place.

U.S. Pat. No. 4,697,537—Retractable Line Storage Device

A retractable line storage device (10) is disclosed. Most particularly the device provides a storage and automatic retrieval device for mooring lines as used on small boats. A hollow housing (18) and more specifically its spindle 26 is adapted to retain reel (28). A mooring line (14) is secured to and wrapped around the reel. The free end of the mooring line passes through top plate (12) and is attached to semi-spherical handgrip (16). A cup (15) is formed in the upper surface of top plate (12) for reception of the handgrip thus providing a flush mounting wherein no part of the device protrudes above the surface of top plate (12) when the line is in its retracted position. Finger grip sumps (19) are provided for access to the fingergrip. A helical spring (31) is attached to housing (18) and to reel (28) for automatic rewinding of the line (14) when storage of the line is desired. A cover plate (29) is provided to facilitate access to the parts contained within housing (18).

U.S. Pat. No. 4,846,090—Boat Mooring Device

A boat mooring device capable of storing and dispensing a rope used to moor a boat or the like is disclosed. A spring biased reel assembly carrying a rope is rotatably mounted within a case. The reel assembly is urged by the spring in a rope take-up direction. A lock assembly selectively inhibits rotation of the reel assembly in a rope pay-out direction. A unique rope guidance system facilitates the withdrawal of rope from, and retraction of rope into, the device.

U.S. Pat. No. 5,002,008—Boat Mooring Device

A boat mooring device connectable into a suitable hole formed into the deck of a boat, the device including a deck plate, a trunnion connected and extending from the unexposed surface of the deck plate, and a spring loaded rope wheel rotatably mounted about a transverse axis at the other end of the trunnion. The device is structured so that rope stored on the rope wheel may be payed out from, or retracted unto, the rope wheel through an aperture in the deck plate as desired. Thereafter, pivotally closing a draw lever hinge connected atop the deck plate's exposed surface activates a spring loaded pawl which lockably engages into one of a plurality of notches formed into the periphery of the rope wheel. When the device is in its closed and locked position, a relatively smooth and uninterrupted surface with the boat deck is provided, the locked mooring rope extending out through the deck plate aperture a desired length for connection to a dock or the like.

U.S. Pat. No. 5,490,805—Retractable Surfboard Leash

An improved retractable leash is provided for attaching a surfboard to a surfer. The leash consists of an elongated line with a storage unit for the line. Elements are for mounting the storage unit onto the surfboard and to allow the storage unit to rotate three hundred and sixty degrees. A component is for attaching a free end of the line to the surfer. When the surfer falls off the surfboard in any direction, the line will pull out more directly from the storage unit. A structure is for retracting the line into the storage unit, so that the slack of the line is taken up to eliminate long line drag in the water as the surfer rides the surfboard on the waves.

U.S. Pat. No. 5,819,6,9—Integral Boat Tethering Device

This instant invention is a spring-loaded boat tethering device. More particularly, it discloses an improved spring-loaded boat tethering device which provides reliable and repeatable extension and retraction of mooring lines, secure attachment to a vessel, and positive locking of the mooring line so as to provide fixed positioning of the vessel relative to another object such as a dock, a pier, or another vessel.

U.S. Pat. No. 6,095,075—Retractable Boat Line

A retractable boat line for mooring a boat is wound about a payoff reel contained within a stationary housing, which may be mounted beneath the exterior surfaces of the boat, for example within the hull, transom or gunnel. The invention provides a locking mechanism that latches into a guide wall of the payoff reel at a point remote from the edges of the guide wall to rotationally lock the payoff reel relative to the housing. The mooring line can thus be selectively extended to a desired length and remains locked to the selected length until the locking mechanism is disengaged.

U.S. Pat. No. 6,182,592—Docking Apparatus

A docking system for vessels employing at retractable docking line coupled to a rotatable spool. The rotatable spool is controlled by an operator of the vessel by a centralized hydraulic or electrical system. The retrieval systems allows for free wheeling line deployment and variable speed line retraction. Solenoid valves and relays are used to allow an operator to retrieve lines at various speeds allowing the vessel to be moved fore or aft for proper docking alignment. A weighted end cap allows for passing of the docking lines and further provides for sealing of the docking system when placed in a storage position.

U.S. Pat. No. 7,168,385—Watercraft Tethering Apparatus

A tethering apparatus for a watercraft includes an elongated flexible line, a spool and a biasing member adapted to urge the spool to automatically uptake portions of the elongated flexible line. A locking device is attached to an end portion of the elongated flexible line to assist in tethering the watercraft to a mooring structure.

U.S. Pat. No. 9,630,682—Rope Storage System

A rope storage system includes a boat that has at least one cleat coupled to the boat. A retracting unit is removably coupled to the at least one cleat. A rope is releasably contained within the retracting unit. The rope is selectively urged outwardly from the retracting unit and the rope may secure the boat to a restraint. The rope is biased into the retracting unit such that the rope is stored within the retracting unit. Thus, the retracting unit reduces a tripping hazard with respect to the rope. A cleat lock is movably coupled to the retracting unit. The cleat lock releasable engages the at least one cleat such that the retracting unit is removably retained on the at least one cleat.

U.S. Pat. No. 9,694,878—Mooring Device

A mooring device includes a canister, a spool having two side walls with teeth around their perimeters, a mooring cable wrapped around the spool, a lid having a first piece and a second piece, and two pairs of stops extending from the bottom surface of the lid. The two pairs of stops engage the notches of the two side walls of the spool when the first piece of the lid rests in the closed position. The stops disengage from the notches when the first piece of the lid is open. A thumbpad allows a user to move the stops from a lock position to an unlocked position without opening the lid. The device extends and retracts the cable to accommodate tidal and other water action.

U.S. Pat. No. 10,029,762—Tether and Clamp Assembly

An anchoring device is provided that is adapted to tether a structure to a fixed support, such as a dock or floating kelp. The anchoring device comprises a reel assembly that enables a user to secure their boat without the use of an anchor. The assembly includes a reel housing, a retractable line, a clamp assembly, and a line guide. The reel housing comprises a pair of control buttons, a gripping handle, and an attachment strap. The first button is adapted to unlock and lock the retractable line in place, whereas the second button is adapted to retract the line back into the housing. The clamp assembly is adapted to secure the anchoring device onto a fixed or floating surface, whereby the clamp assembly comprises a first and second clamp member in biased relationship with one or more of peripheral teeth, inner tines, and a high friction inner surface.

US Application No. 2006/0150883—Retractable Mooring Line Device

A retractable mooring line device comprising a reel for storing and paying off a mooring line (2), having side walls (22, 24) each comprising a series of notches (60) for receiving a releasable latch (54). A latch simultaneously engages between notches in both side walls (22, 24) at a substantially right angle to provide a secure, positive locking engagement between the latch and the reel while permitting the latch (54) to be released under the application of relatively little force. In the preferred embodiment the latch may be actuated by a user's hand or foot and is biased toward the reel by a spring (70) which bears against the housing (18). The mechanism can be exposed for maintenance or repair simply by removal of the gunnel plate (16) and reinstallation of the gunnel plate does not require special loading of the latch spring.

US Application No. 2008/0257999—Anchoring System and Method

An apparatus for docking and/or mooring vehicles, particularly watercraft and for restraining loads in truck beds or trailers. The apparatus utilizes ropes or cables in housing unit that provides for the extension and retraction of the rope or cables preferably without the need of electrical or manual cranks. The housings are adaptable to be mounted on the vehicle or at an attachment or docking location and are biased to retract but may contain stops or cleats for manually tying off and thus stopping the extension or retraction of the rope or cable. The housings may be further adapted to be flush mounted in relation to surrounding surfaces or to contain lights.

US Application No. 2009/0236460—Line Length Adjustment Device for Mooring Lines and the Like A line length adjustment device includes a strap having a rope loop attached to one end, the other end wound up on a winder core in a housing which has a rope loop at an end opposite a slot receiving the strap. A gripper element normally engages the strap to lock it in any adjusted length, which is manually releasable to allow unwinding of the strap.

U.S. Application No. 2011/0146557—Low Profile Tethering Device for Securing a Boat A tethering device for a boat may be mounted to a dock so that the top surface of the tethering device is flush with the top of the dock. Inside the housing is a retraction reel storing a sufficient length of line to provide tethering of the boat to the dock while retracting excess line back for out-of-sight storage but leaving the pre-selected length of line extending from the tethering device. The housing also has a line locking mechanism to hold the line at the pre-selected length so as to prevent the boat from drifting away taking line with it.

BRIEF SUMMARY OF THE INVENTION

In accordance with one aspect of the invention, a first embodiment of a device for storing and dispensing line used to moor a boat includes a user interface canister, an auto-retracting reel assembly, and conduit connecting the user interface to the reel assembly. The user interface (also referred to herein as a "user interface canister") includes a canister having a top lid, rail support having a catch, button, and lid springs, locking nut, stopping collar, and a bottom lid. The top lid sits on top of and slides horizontally along the rail support to open and close. The mooring line is wound onto the auto-retracting reel assembly and the looped end of the mooring line is stored in the canister of the user interface until it is ready for use. When a user is ready to dock the vessel, he may slide the top lid along the rail support until the catch engages in the locking well, pushing the button upwardly to engage a hole defined by the top lid. The top lid is then locked, in the open position and the internal cavity within the canister is exposed, thereby providing access to the looped, distal end of the mooring line inside. The looped end is pulled out of the canister, causing the auto-retracting reel to unwind a desired length of the mooring line, and then the line is locked in place by pushing the button down to disengage the catch. This arrangement allows the springs to pull the underside of the top lid so that it is biased toward a closed position. The mooring line is then locked into position as the mooring line is pinched between the spring-loaded top lid and the internal side of the canister and rail support.

To return to the starting position, the user unties the mooring line from the dock cleat or other attachment means and simply re-opens the top lid, thus causing the mooring line to automatically retract back into the canister and wind up back onto the reel until the stopping collar prevents the looped end of the mooring line from retracting any further. Once the mooring line has been fully retracted so that the looped end is disposed within the canister, the top lid is then slid closed for storage and transport purposes.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

Figure 1:
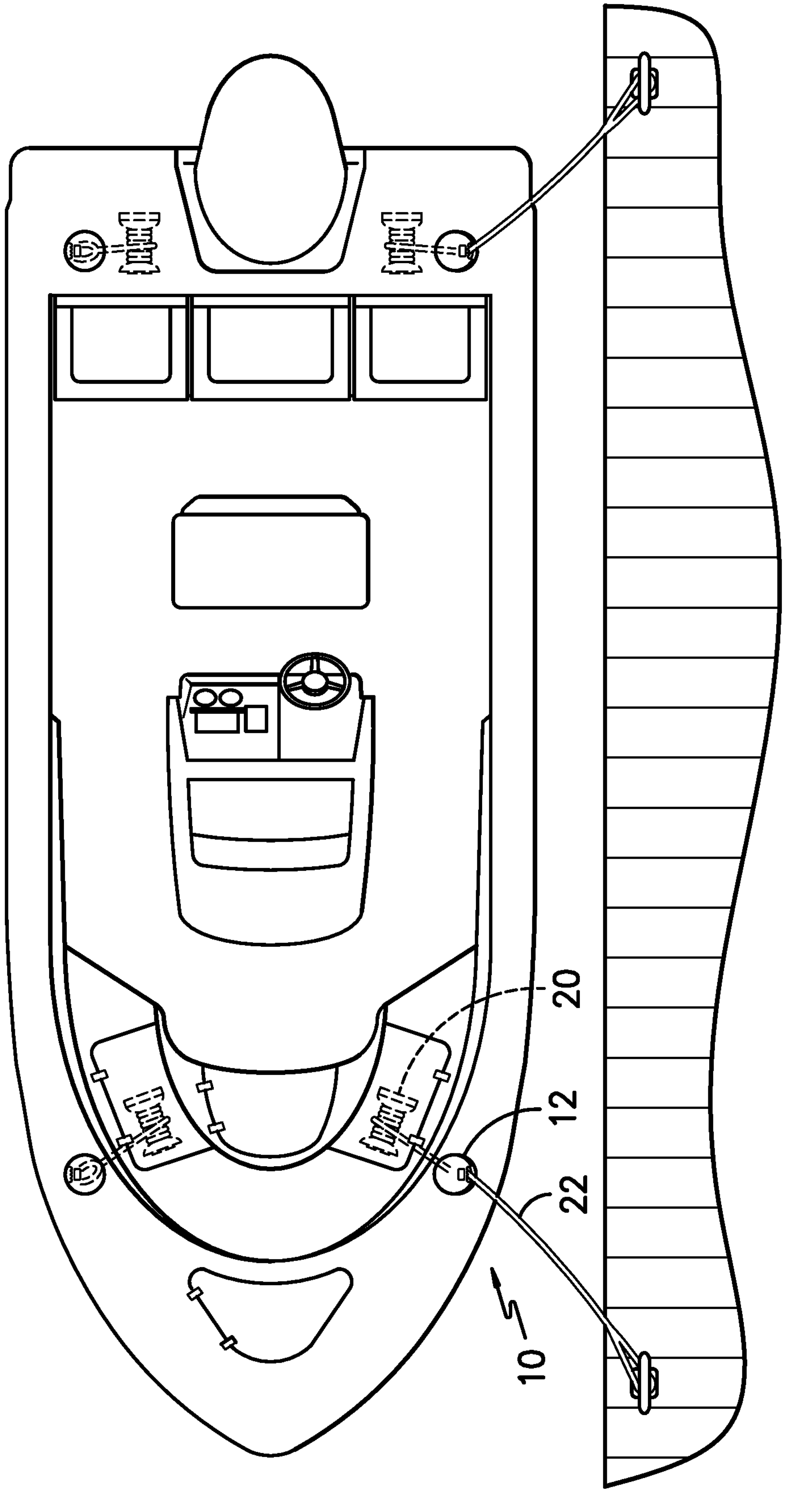
FIG. 1 is a perspective view of one embodiment of a retractable docking line, wherein the retractable docking line includes a user interface canister, an auto-retracting reel assembly, and a mooring line.

The present invention includes, in a first embodiment, a retractable mooring line assembly storing and dispensing line used to moor a boat 10, and includes a user interface 12 having a canister 14 with a top lid 16 and a bottom lid 18, an auto-retracting reel assembly 20 which windably stores mooring line 22, and optionally, a conduit 24 that connects the reel assembly 20 to the user interface 12. Between the top lid 16 and canister 14 is the rail support 26. The top lid 16 slides along the parallel rails that are horizontally disposed on a top portion of the rail support 26 to open and close the canister 14. The mooring line 22 feeds from the reel assembly 20 upwardly through a hole defined by the bottom lid 18, and into the canister 14. The looped end 28 of the mooring line 22 is stored in the canister 14 until ready for use.

The rail support 26 is a generally circular collar that is disposed on a top portion of the canister 14, and includes a pair of parallel horizontal rails 54 for engaging a pair of grooves 56 on the underside of the top lid 16 so that the top lid 16 may slide horizontally between an open and closed position. The rail support 26 defines a centrally disposed hole 58 that the mooring line 22 passes through, and further includes a catch 30 and lid springs 34 which allow for the mooring line 22 to be locked into the desired position. The top lid 16 further includes a button 32 which is used in connection with the catch 30 and lid springs 34 to lock the mooring line 22 into the desired position. A spring 64 is positioned underneath the catch 30 such that when the catch 30 is engaged and the button 32 is not pressed down, the spring 64 is disengaged and potential energy is stored. When the catch 30 is disengaged and the button 32 is pressed down, the spring 64 is engaged in order to lock the mooring line 22 into the desired position.

Figure 2:
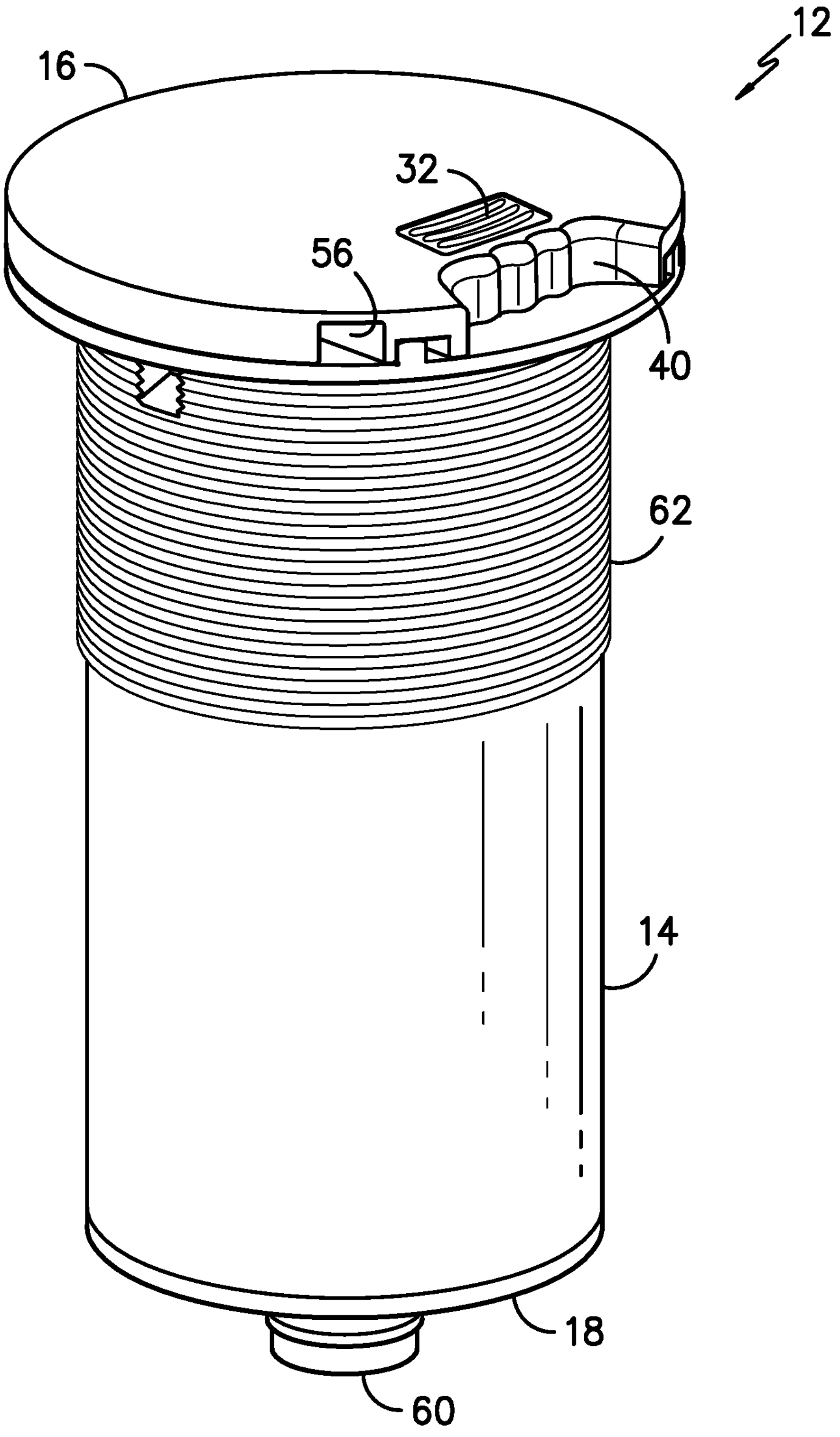
FIG. 2 is a perspective view of one embodiment of a user interface, wherein the user interface includes a canister with a top lid with locking teeth and a bottom lid.
Figure 3:
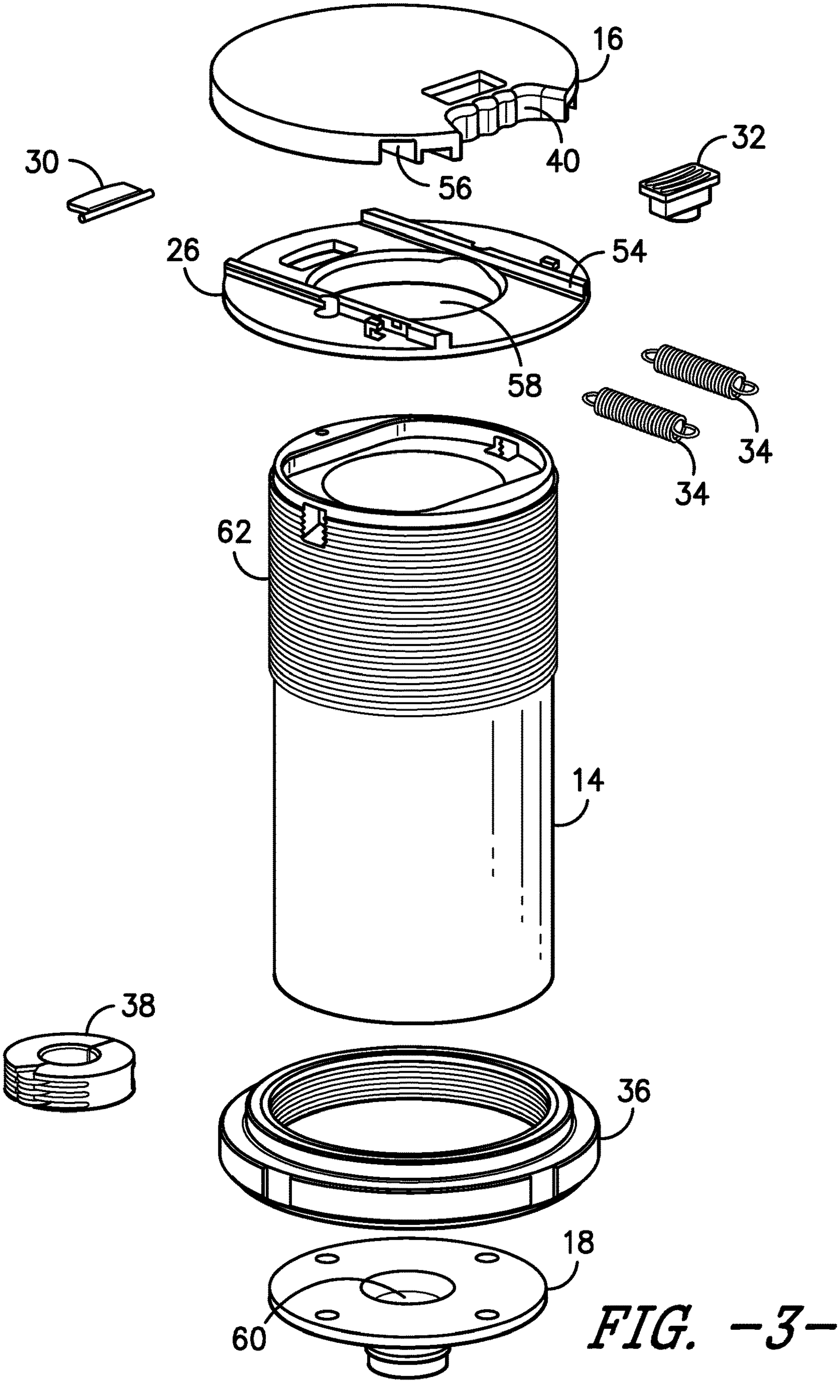
FIG. 3 is an exploded view of one embodiment of a user interface, wherein the user interface includes a canister with a top lid with locking teeth, a catch, and a button, a rail support between the top lid and the canister which includes lid springs, and a locking nut and stopping collar between the canister and a bottom lid.
Figure 4:
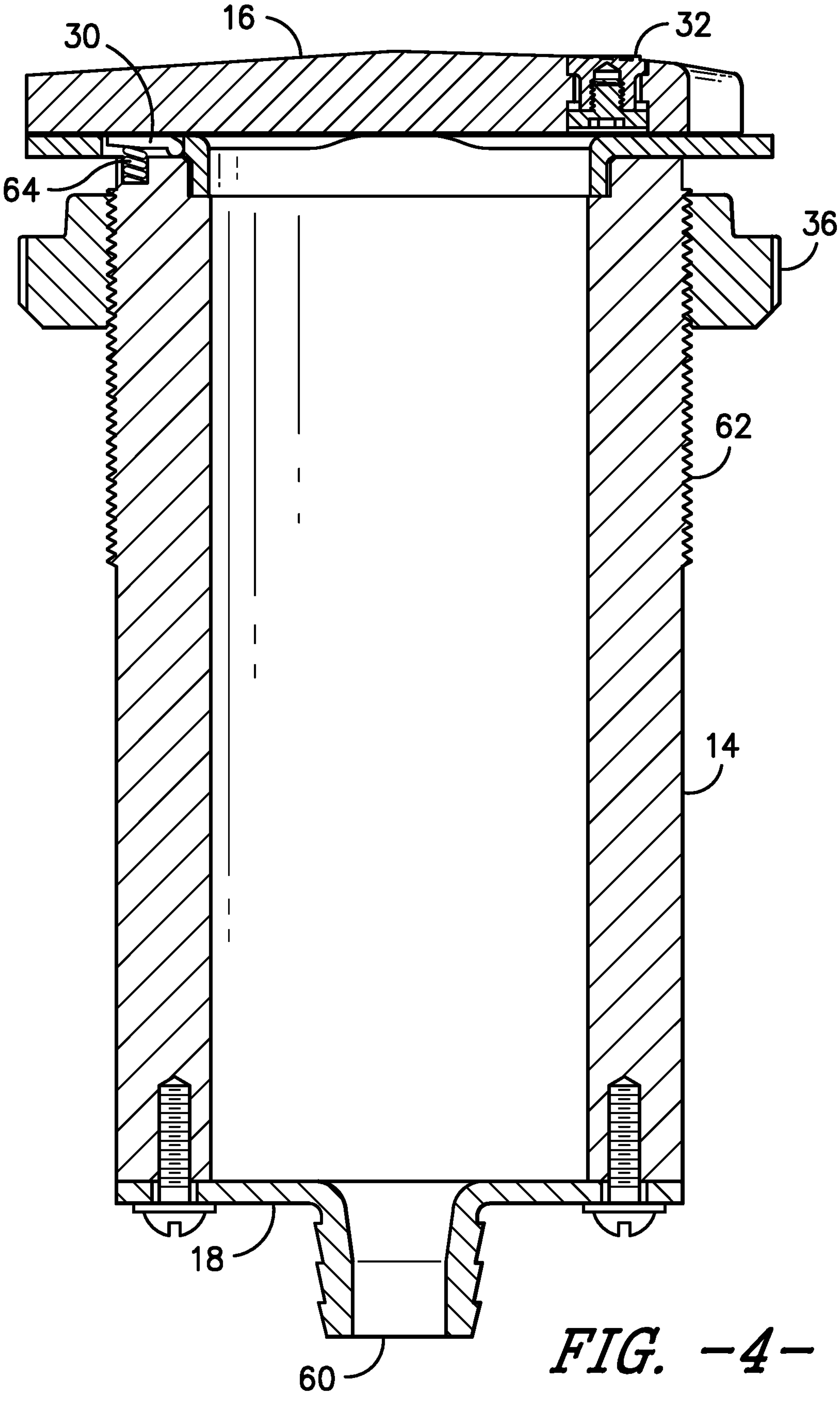
FIG. 4 is side perspective view of one embodiment of a user interface canister, wherein the top lid is closed.
Figure 5:
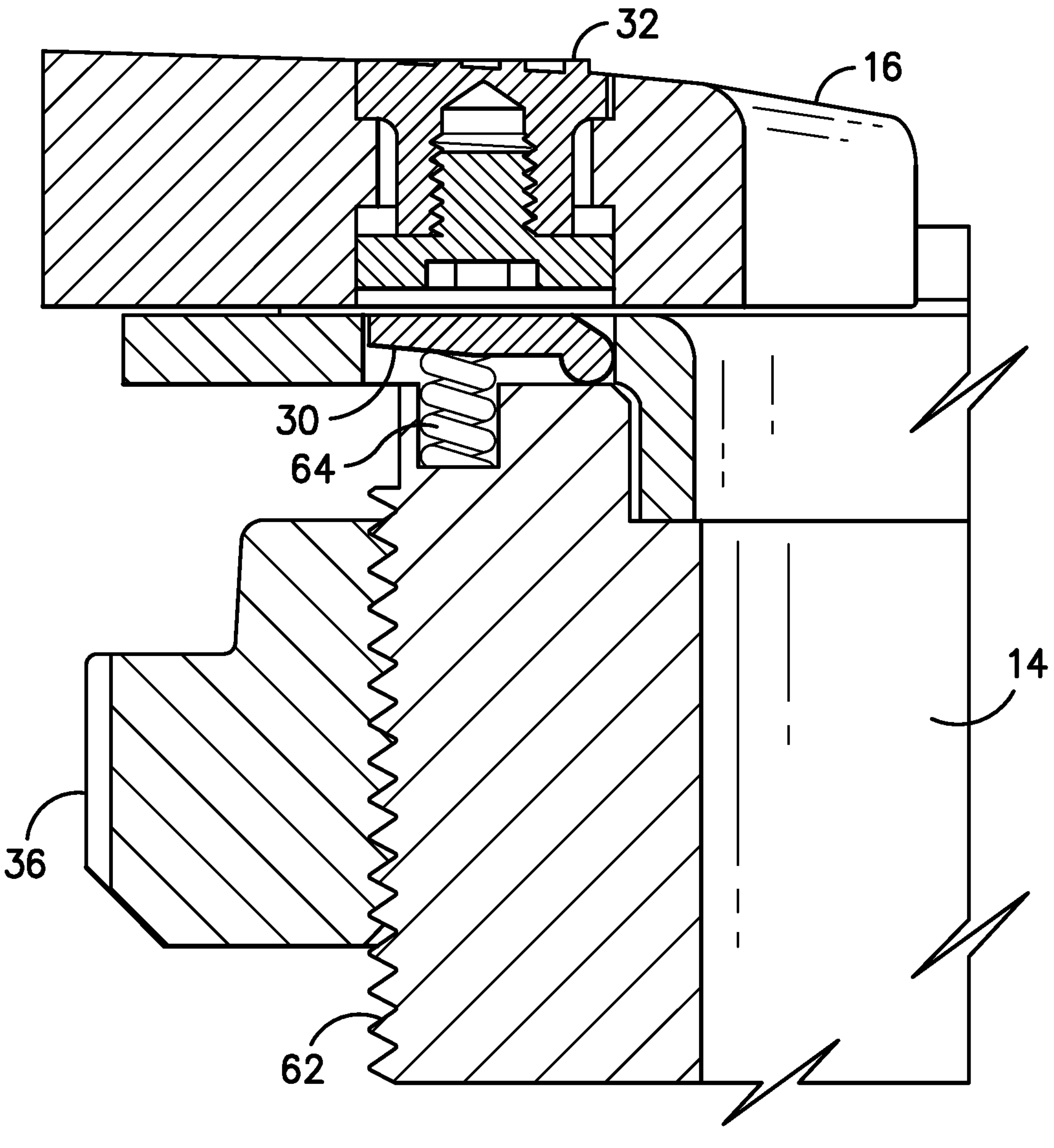
FIG. 5 is a side view of the top portion of a user interface canister, wherein the lid is in the open position, the catch is disengaged, the button is pressed down, and the springs are engaged in order to shut the lid or pinch the rope.
Figure 6:
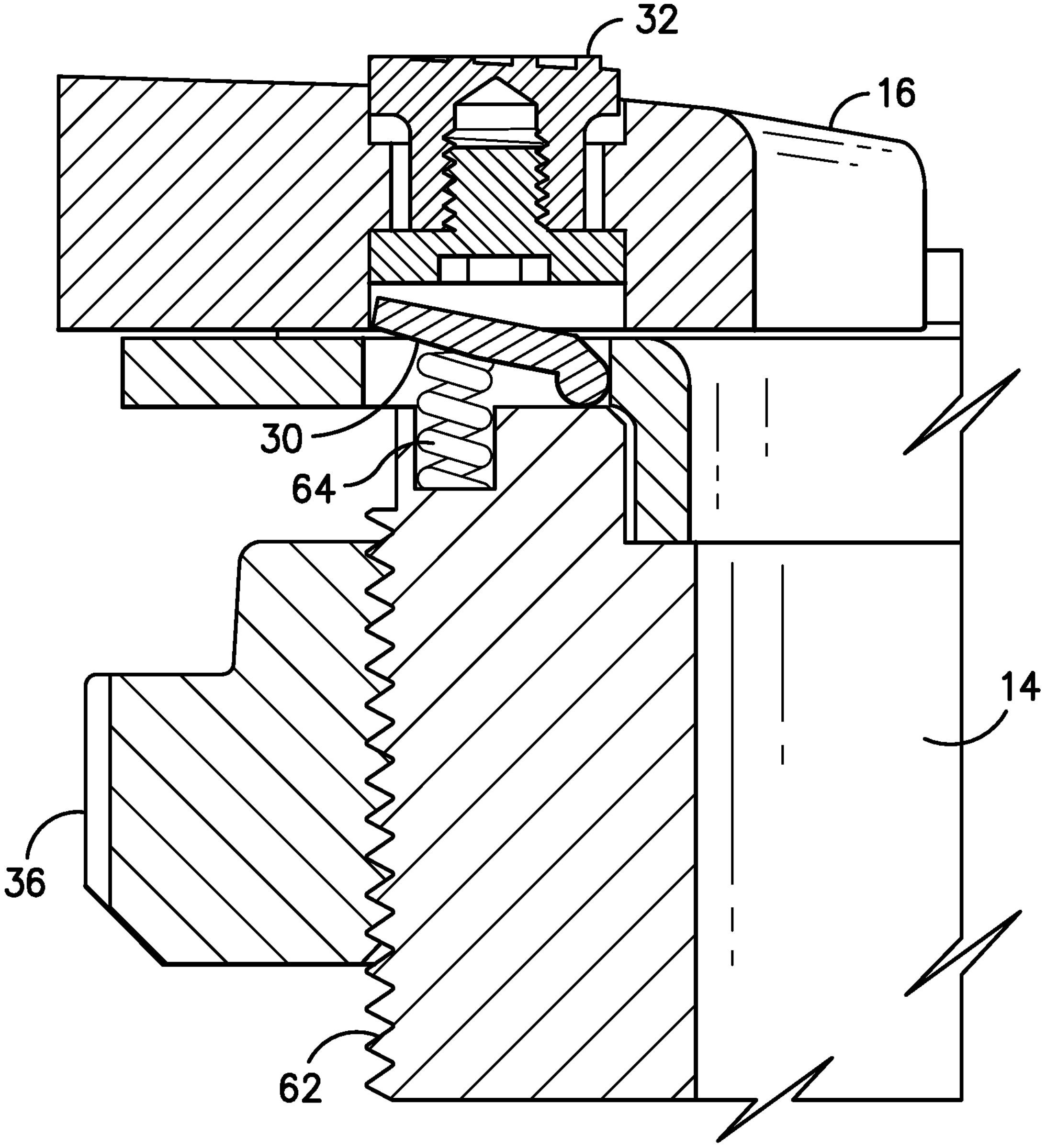
FIG. 6 is a side view of the top portion of a user interface canister, wherein the lid is in the open position, the catch is engaged, the button is up, and the springs are disengaged, allowing potential energy to be stored.
Figure 7:
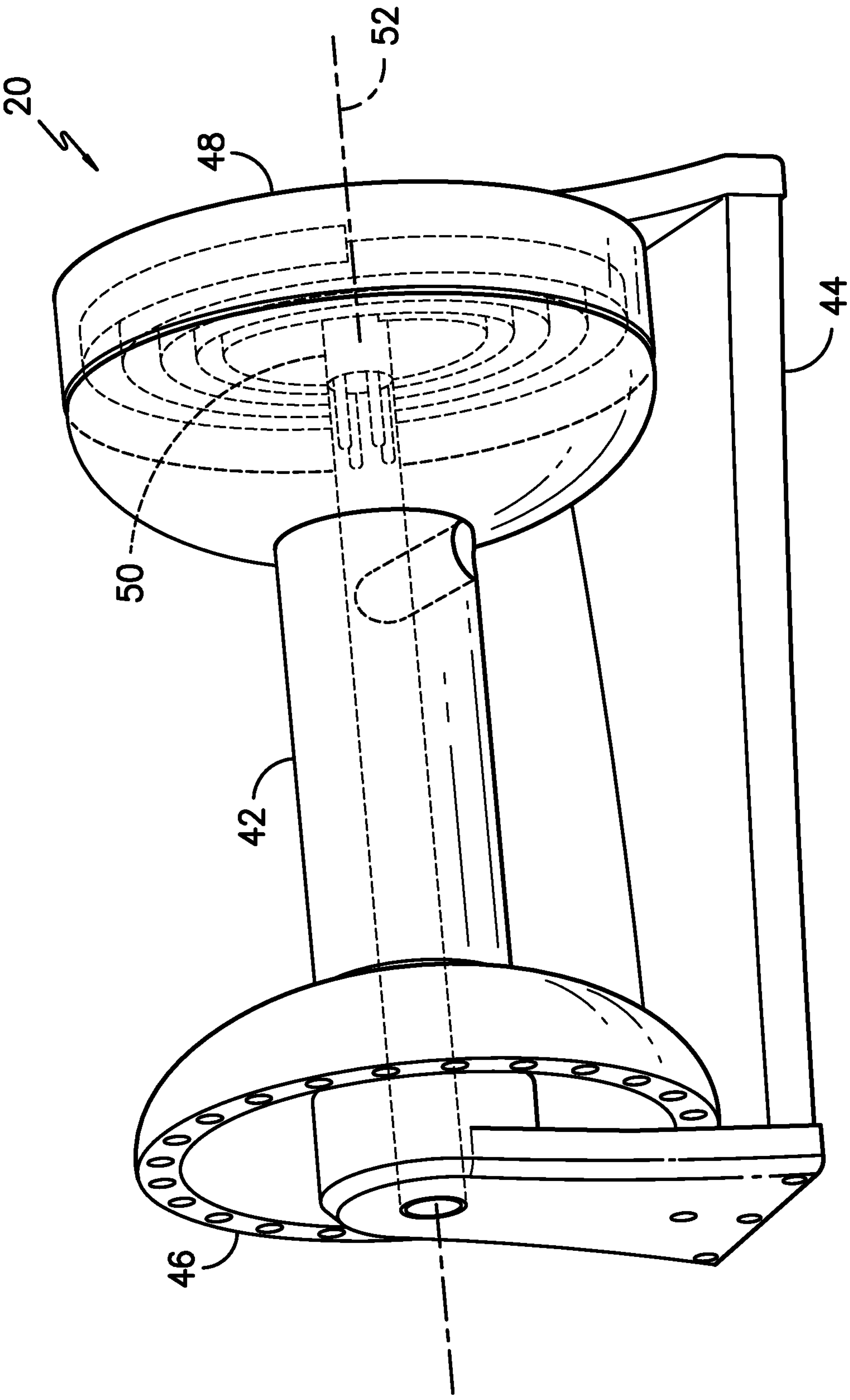
FIG. 7 is a perspective view of the auto-retracting reel assembly, wherein the auto-retracting reel assembly includes a base, a spool with a free end and a spring end, and a spring.
Figure 8:
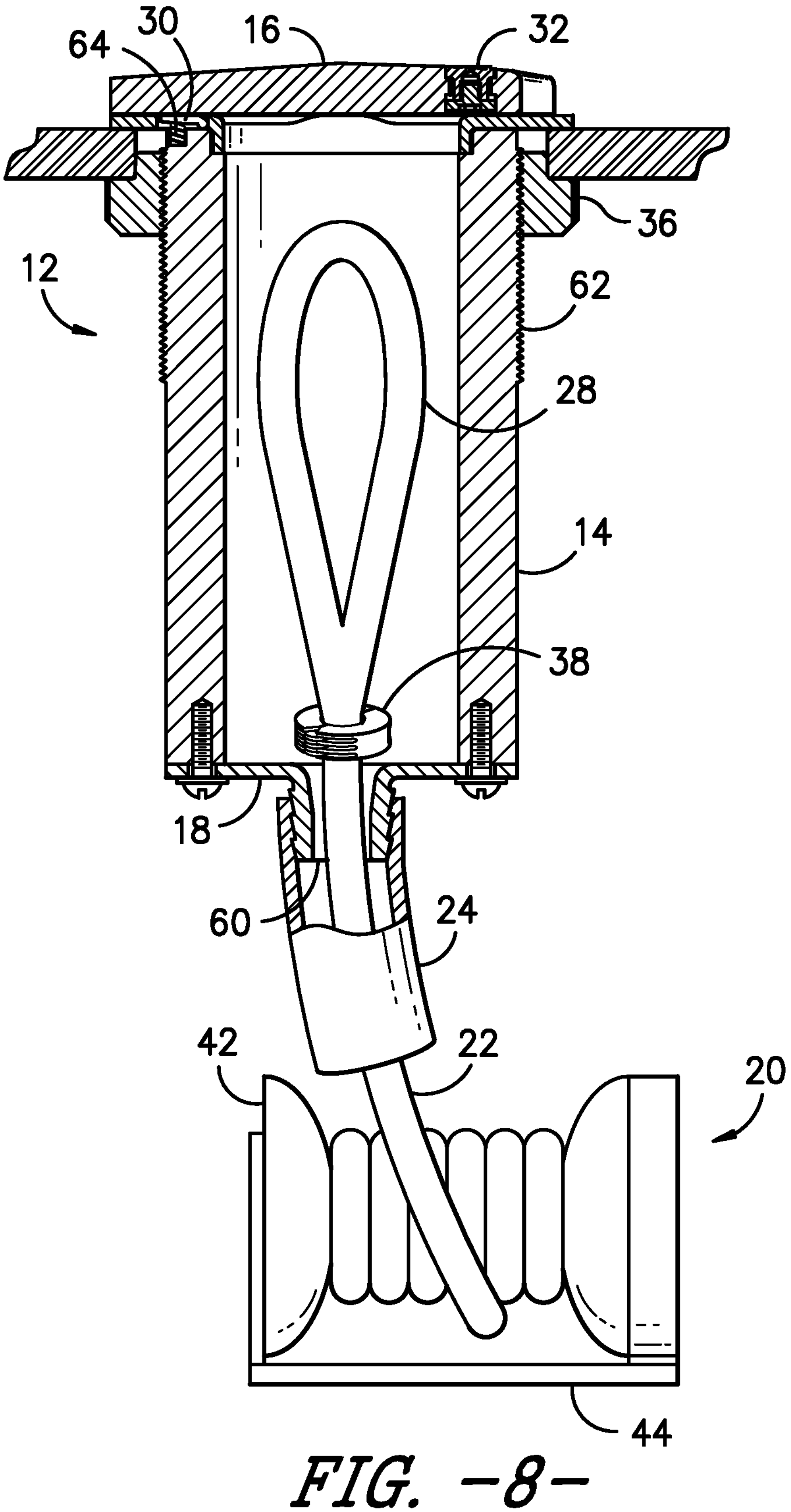
FIG. 8 is a perspective view of the mooring line stored around the auto-retracting reel assembly connecting to the user interface and stored inside the canister of the user interface.
Figure 9:
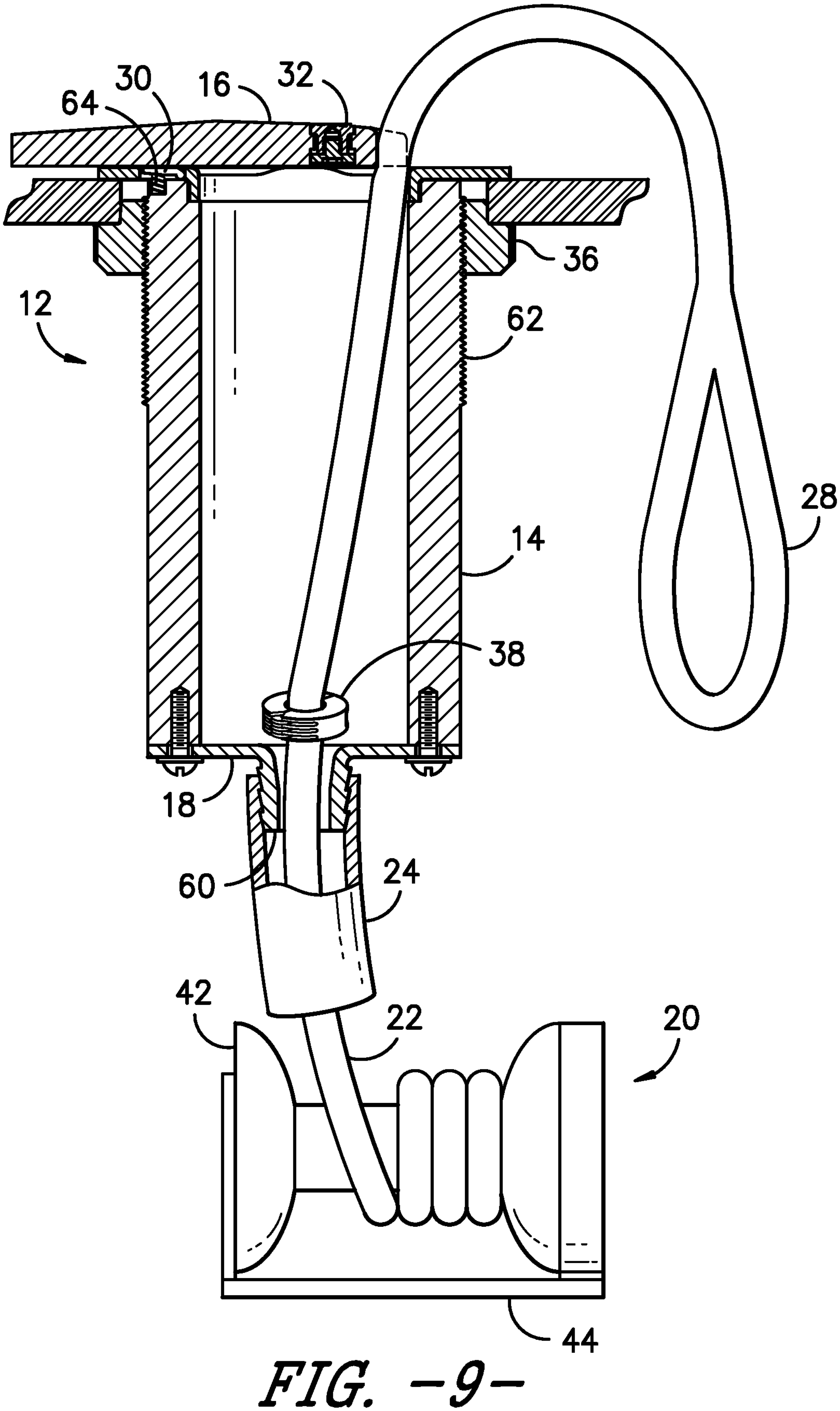
FIG. 9 is a perspective view of the top lid of the canister in the open position, with the mooring line pulled out of the canister ready for use.

The top portion of the canister 14 may include a threaded collar 62 to allow for attachment to a boat. At the bottom of the canister 14 a locking nut 36 and a stopping collar 38 are provided, and include a portal 60 through which the mooring line 22 may pass. The locking nut 36 and stopping collar 38 are preferably placed between the canister 14 and the bottom lid 18, as shown in FIG. 3. The top lid 16 opens by sliding horizontally along the rail support 26 until the catch 30 engages in order to maintain the top lid 16 in the open locking position, which causes the button 32 to be pushed upwardly while the top lid 16 is locked into the open position, as shown in FIG. 6. When the top lid 16 is open, the canister 14 is exposed and the looped end 28 of the mooring line 22 is visible and accessible to a user. The mooring line 22 may be pulled outwardly from the canister 14, unwinding from the auto-retracting reel assembly 20 for securing the vessel to a dock, pier, another boat, or the like. To lock the extended mooring line 22 into desired position so that the mooring line 22 does not retract back onto the auto retracting reel assembly 20, the button 32 is pressed down to disengage the catch 30, which allows the lid springs 34 to pull the top lid 16 toward a closed position. The top lid 16 may include an indentation having locking teeth 40, as shown in FIGS. 2 and 3. These locking teeth 40 press against the mooring line 22 in combination with the force of the springs 34 to pinch the mooring line 22 securely into a desired position (or length), so that the mooring line 22 is pinched between the locking teeth 40 of the top lid 16 and the inner edge of the hole defined by the rail support 26. To unlock the mooring line 22 from this locked position and release the mooring line 22 so that it may be retracted back to its original storage location on the auto-retracting reel assembly 20, the top lid 16 is opened and the mooring line 22 is removed from the dock cleat or other securing mechanism on the dock, pier, or the like. The mooring line 22 automatically retracts until the stopping collar 38 prevents the looped end 28 of the mooring line 22 from passing therethrough. The mooring line 22 is wound onto the reel assembly 20 and the looped end 28 of the mooring line 22 is disposed within the canister 14 when not in use, preferably with the top lid 16 in a closed position. It should to be understood that any type of stopping mechanism may be used to prevent the looped end 28 of the mooring line 22 from pulling through the bottom portion of the canister 14. Additionally, any suitable locking mechanism may be used to prevent the mooring line 22 from retracting back onto the auto-retracting reel assembly 20, including clamps, mechanical stops that engage gears, or any other suitable locking mechanism.

The auto-retracting reel assembly 20, in one embodiment, includes a spool 42, a base 44 with a free end 46 and a spring end 48, and a spring 50. The spring 50 is a flat rolled steel coil spring that provides the storage for the energy required to spin the reel assembly 20 and retract the mooring line 22. When the mooring line 22 is extended, the spring 50 winds up more tightly, causing the spool 42 to be biased toward a wound position. The spool 42 sits inside of the base 44 wherein one end of the spool 42 attaches to the spring end 48 and the other end of the spool 42 attaches to the free end 46. The spool 42 rotates along the horizontal axis 52 in order to extend and retract the mooring line 22. It should be understood that the auto-retracting reel assembly 20 may take any form that is suitable for retracting a boat mooring line, and such auto-retracting reel assemblies are commercially available in various forms with different types of assemblies and components.

In a preferred embodiment, the user interface 12 is installed on the outside or gunwale of the boat near where a cleat would be placed for tying an external rope, and the auto-retracting reel assembly 20 is installed in a hidden place such as the inside of the boat near the wall of the boat. In an alternate embodiment, the retractable mooring to line assembly 10 may be mounted onto a dock, pier, or the like, so that the mooring line 22 may be extended therefrom and secured to a boat, rather than extending from the boat to the dock. The auto-retracting reel assembly 20 may also include a locking mechanism for locking the spool 42 in place. An example of a suitable locking mechanism can be seen in U.S. Pat. No. 9,694,878, which is incorporated herein by reference (see FIG. 12, Elements 16, 62 and 64). This arrangement is particularly useful when the mooring line 22 needs to be replaced. To replace an old line on the spool 42, a user can pull the mooring line 22 until most of the line has been disengaged from the spool, lock the spool in place using the locking mechanism, replace the mooring line 22, and then release the locking mechanism for auto-retraction. It should be noted that while the locking mechanism cited above is a suitable locking mechanism for incorporation into this retractable mooring line assembly, other types of locking mechanisms may be used, instead, and such locking mechanisms are well known in the art.

The conduit 24 connects the auto-retracting reel assembly 20 to the user interface 12 and functions as a channel for the mooring line 22 to pass through unobstructed between the reel assembly 20 and the user interface 12.

Although the present invention has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

The invention claimed is:

1. A retractable mooring line assembly for storing and dispensing line used to moor a boat, comprising:

a mooring line having a loop on a distal end thereof;

a user interface comprising a canister including a top lid and a bottom lid, wherein said top lid is slidably engaged with an upper portion of said canister, and wherein said bottom lid defines a hole through which a mooring line may, pass; and an auto-retracting reel assembly for windably storing said mooring line, said reel assembly having a spool rotatably attached to a base, and further including a spool spring operatively engaged between said spool and said base to provide a constant force for automatically winding said mooring line onto said spool; wherein said mooring line runs from said auto-retracting reel, through said bottom lid of said user interface and the looped end of said mooring line is stored in said canister until ready for use.

2. The retractable mooring line assembly set forth in claim 1, further including a conduit that is operatively connected between said canister and said auto-retracting reel assembly, wherein said conduit provides an unobstructed passageway for said mooring line to connect said reel to said user interface.

3. The retractable mooring line assembly set forth in claim 1, further including a rail support including a pair of parallel rails disposed in a generally horizontal orientation and a centralized hole defined by said rail support, wherein said rail support is disposed on a top portion of said canister and directly underneath said top lid.

4. The retractable mooring line assembly set forth in claim 3, wherein said top lid includes a pair of grooves on an underside thereof for engagement with said pair of rails on said rail support for slidable engagement therewith in a generally horizontal direction.

5. The retractable mooring line assembly set forth in claim 3, wherein said rail support further includes a catch and button for holding said top lid in an open position and at least one lid spring operatively engaged to said rail support and said top lid for biasing said top lid toward a closed position.

6. The retractable mooring line assembly set forth in claim 5, wherein said lid spring is a flat rolled stainless steel coil spring.

7. The retractable mooring line assembly set forth in claii wherein said user interface further includes a locking nut and stopping collar disposed on said bottom lid, wherein said stopping collar allows said mooring line to pass therethrough, but prevents said distal, looped end of said mooring line from being pulled through said bottom lid of said canister.

8. The retractable mooring line assembly set forth in claim 1, wherein said top lid further includes an indentation on one side of said top lid, which defines an opening for a user to pull said mooring line out when ready to dock a vessel.

9. The retractable mooring line assembly set forth in claim 8, further including a set of teeth disposed on said indentation on said one side of said top lid for engaging said mooring line to lock said mooring line into desired position clue to frictional engagement between said teeth and an inner portion of said hole defined by said rail support.

10. The retractable mooring line assembly set forth in claim 1, further including a conduit that is operatively connected between said bottom lid of said user interface end said auto-retracting reel assembly, so that said mooring line runs through said conduit.

* * * * *